Sept. 16, 1930.   T. P. HOLT   1,775,767
PROCESS OF TREATING ORES
Filed July 11, 1928   3 Sheets-Sheet 1

Inventor,
Theodore P. Holt
Atty.

Sept. 16, 1930.   T. P. HOLT   1,775,767
PROCESS OF TREATING ORES
Filed July 11, 1928   3 Sheets-Sheet 3

Patented Sept. 16, 1930

1,775,767

UNITED STATES PATENT OFFICE

THEODORE P. HOLT, OF WHITTIER, CALIFORNIA

PROCESS OF TREATING ORES

Application filed July 11, 1928. Serial No. 291,926.

In my joint United States patent with Niels C. Christensen, Jr., process of treating ores, No. 1,107,240, August 11, 1914, there is disclosed and claimed a blast process for treating ores, comprising their preparation, subsequent roasting, and lixiviation.

In United States Patents Nos. 1,113,961 and 1,113,962 dated October 20, 1914 and No. 1,251,189 dated December 25, 1917 granted to George H. Dern and myself, as joint patentees, certain blast ore roasters are described and claimed for carrying out the process of Patent 1,107,240 aforesaid.

The present invention relates to an improved "cyclic" process for treating refractory ores which utilizes, in a new manner, that is, by "cyclic" treatment, the process and the principle of the roasters set forth in the aforesaid patents.

This new cyclic process enables remarkable recoveries to be obtained over what is obtainable from a single treatment. When refractory ores are subjected to chloride blast roasting and leaching according to this cyclic treatment, I have found that on the second passing of the leached tailings from the first treatment through the roasting and leaching cycle, the second per cent of extraction is often higher than that obtained from the first cycle; and, a third cycle, on most ores, leaves but little metals in the residues.

Ores of the metals of copper, lead, zinc, silver, gold, etc., the treatment of which is improved by roasting previously to leaching, may be most advantageously treated by my improved cyclic process. In the treatment of the aforesaid ores by the well-known roasting and leaching methods, there is often much loss of valuable metals, such loss being, by my improved cyclic process, turned into a very high percentage of recovery.

In the treatment of the aforesaid ores according to ordinary roasting and leaching methods, the loss of valuable metals is chiefly due to the fact, that a considerable part of the metals are in a form insoluble in the solvent used. The principal reasons for this are: first, variations in the character of the ores and the operating conditions in the furnace or roaster, render it impossible to obtain a perfect roast in a single passing through the roaster; second, most chemical reactions by which insoluble metal compounds are converted into soluble compounds in the roasting operation are balanced and reversible according to the chemical law of mass action.

Regarding the variation in the character of the ores and the operating conditions in the roaster, no special comment is necessary.

In respect to the chemical law of mass action, it may be said that this law is sometimes overlooked but as it is of importance herein, a specific case is given as, for example, the following equation:

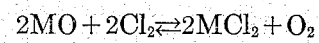

In the equation given, the metal chloride $MCl_2$ is the soluble form desired. After a certain point is reached in the roasting process, the molecular concentration becomes such on the right of the equation, that the reaction velocity becomes the same in both directions. Suppose for example that this reaction becomes "balanced" when 80% of the metal is converted to $MCl_2$. This therefore would be the limit of recovery possible in the subsequent leach. However, if we leach out this 80% and again bring to the roasting temperature, the reaction will again proceed in the desired direction, and another 80% more or less, of the insoluble metal will be converted to a soluble form. Thus the possible extraction is raised to 96%. Should a third roasting cycle followed by a third leaching cycle be used, the possible recovery assuming other conditions perfect would be 99.2%. While the above figures are merely used to make clear the point under discussion, in some of my experiments on ores, I have obtained approximately the same results. It is therefore obvious that it is possible to obtain very high recoveries by this method of operation, as compared with the single treatment as is now common practice.

I have devised a milling method which is cheap to install, practical to operate, and renders recovery of the added metals profitable. The apparatus shown in the drawings and hereinafter described, I have found to be adapted to carry on, in a practical manner, my improved "cyclic" process but it will be understood that the details of construction and arrangement may vary with the character of the ore being treated and the solvent solution employed.

In describing the process, it will be assumed that the ore under treatment gives the most economic recovery when passing the roasting and leaching cycle three times.

Figure 1:
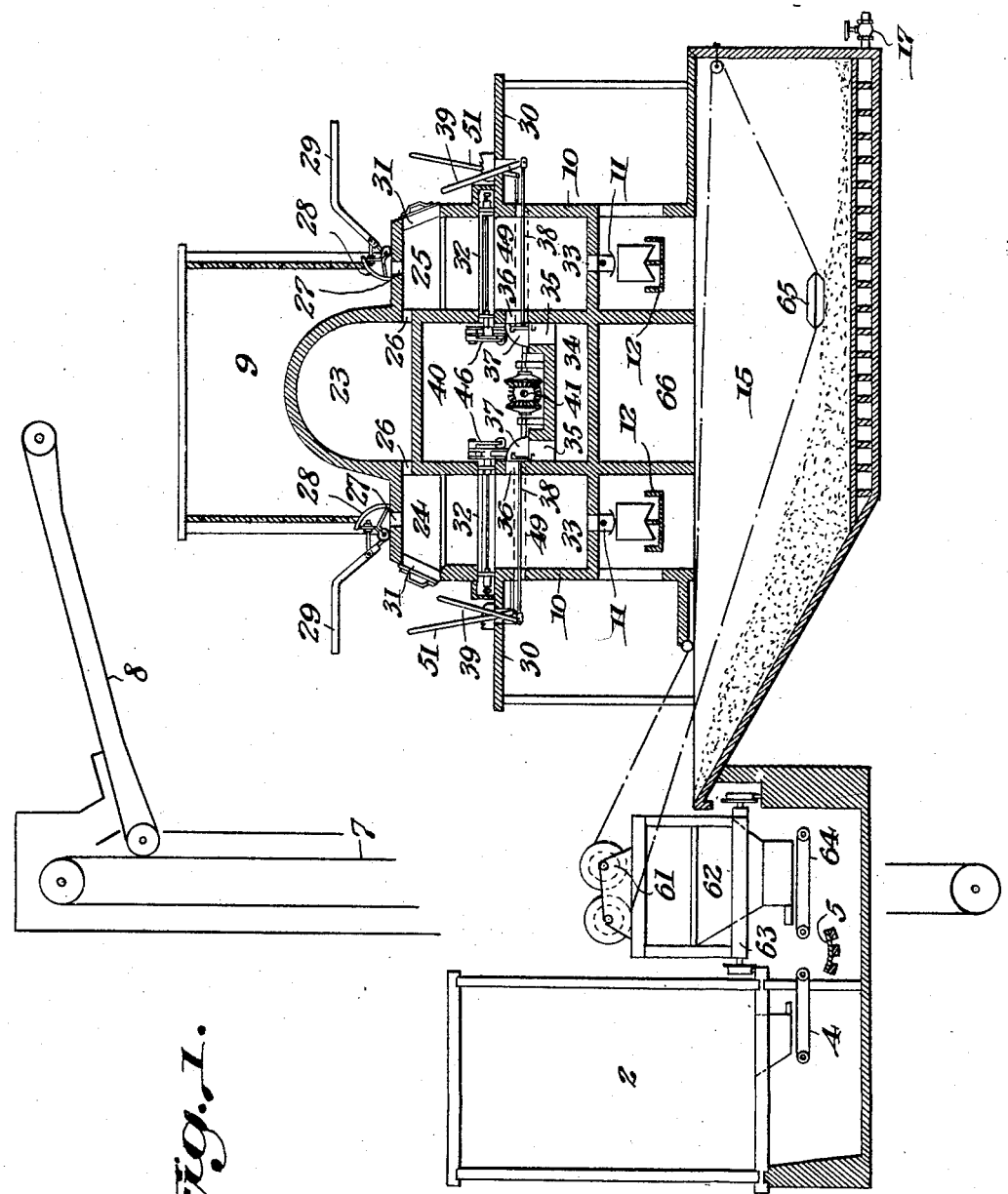
Figure 1, is a vertical elevation showing an improved apparatus or installation for carrying out the process, the showing of the feeders and elevator being more or less diagrammatic.
Figure 2:
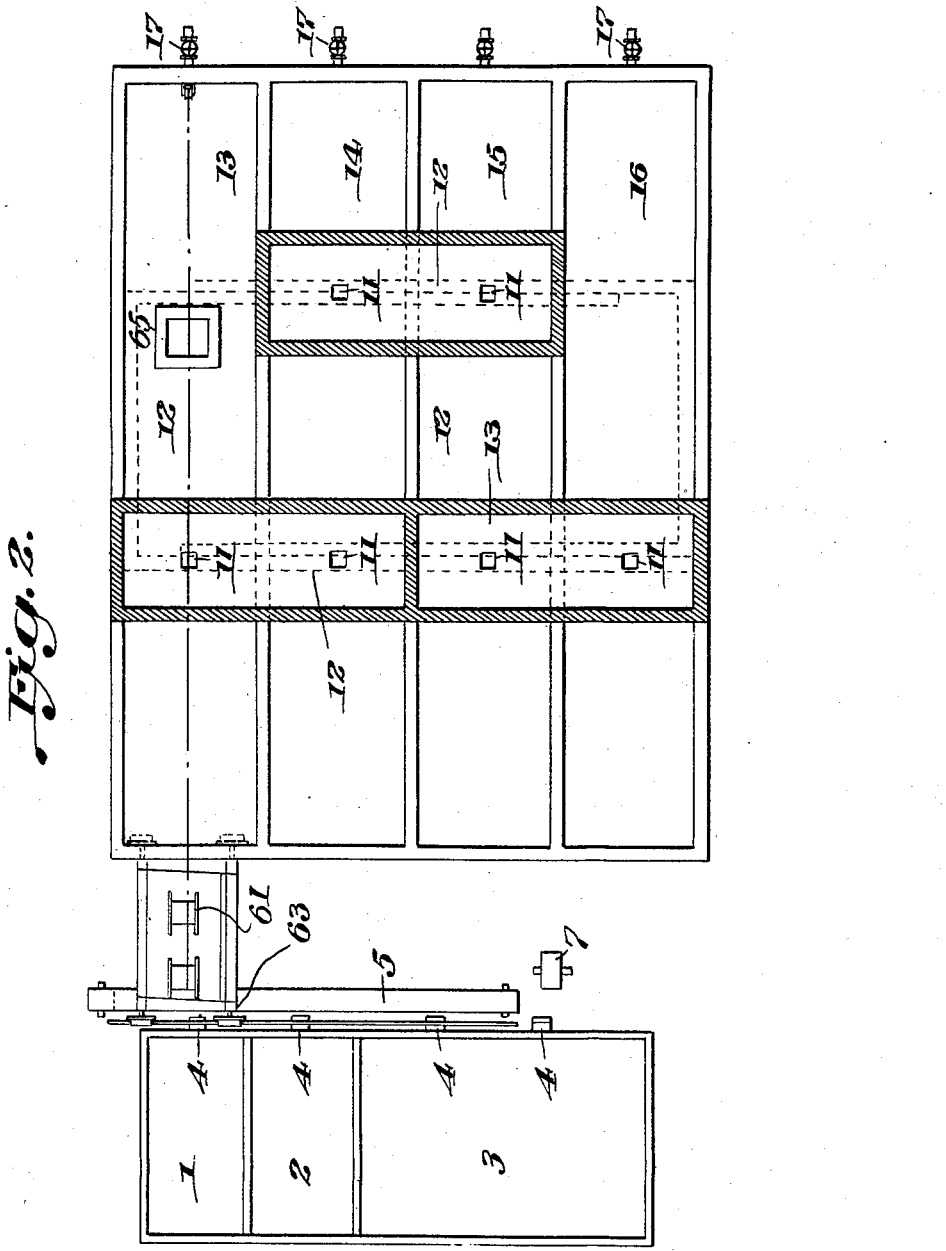
Fig. 2, is a horizontal section, diagrammatic in respect to the conveyors and bins.
Figure 3:
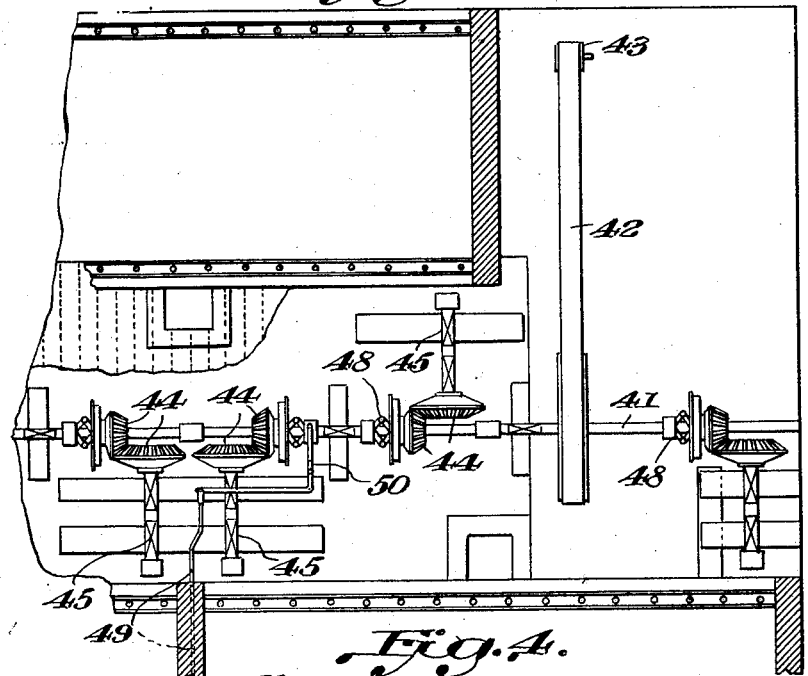
Fig. 3, is a fragmentary detail horizontal section on the line AA, Fig. 4.
Figure 4:
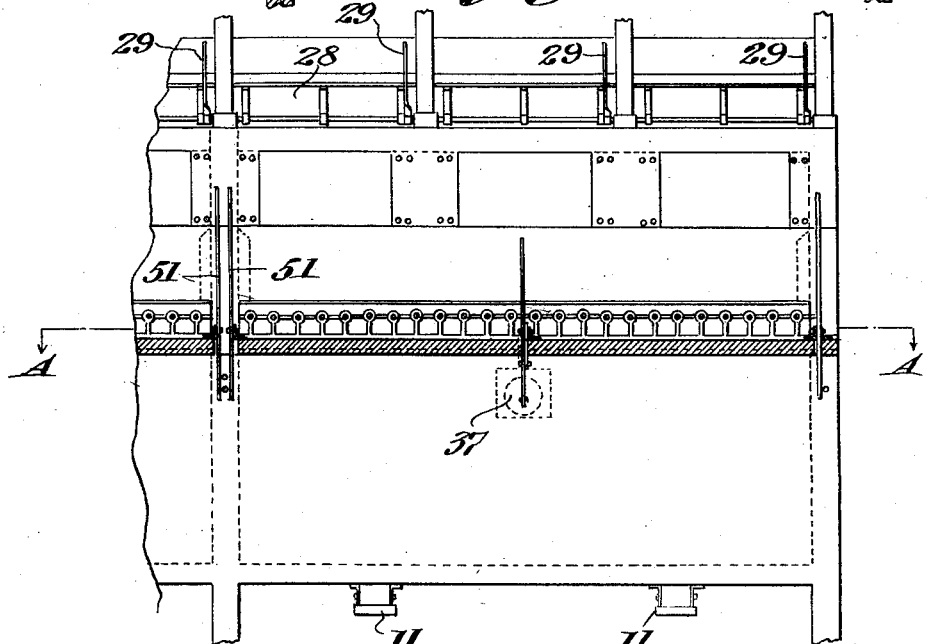
Fig. 4, is a fragmentary front elevation of the roaster.

The improvements on the roasters of Patents 1,113,961; 1,113,962 and 1,251,189 are disclosed in Figs. 1, 3 and 4.

Two systems of preparing the charge for blast roasting are in common use, which are commonly referred to as the "batch" system, and the continuous feeder system. Either system may be used in carrying out my process, although reference is made only to the continuous feeder system.

The fuel, salt, and ore are delivered from the bins 1, 2, 3 onto a suitable conveyor 5, from which the material is elevated by any suitable elevator 7 which discharges the material onto a distributing conveyor 8 that drops it into a storage bin 9 above the roasters.

The roasters will be more fully described hereinafter but, for the purpose of describing the process, they are generally designated 10.

After roasting in the blast roasters 10, the ore is discharged through the gates 11 into distributing launders 12.

The launders 12 deliver the roasted ore into one of the leaching tanks 13, 14, 15, 16. The tanks have draw-off valve connections 17 through which the solutions filtering from the tanks may pass for treatment by any suitable method, such as chemical precipitation, electrolysis, etc. for the recovery of the metals, the solutions being returned for reuse in the leaching plant. However, where it is found to be preferable, upward leaching, instead of downward leaching may be resorted to for the purpose of preventing the ore from packing, which tends to produce uneven percolation.

On the first pass through the roasters 10 and into the distributing launders 12, the roasted ore is delivered into tank 13. The draining of the solution containing the soluble metals, completes the first cycle of my cyclic method.

On the second cycle, the partly leached charge is returned and mixed with sufficient fuel, and other reagents if required, to prepare it for re-roast. To cheaply perform this operation, the arrangement of a power scraper as shown is economical, which is adapted for use in any one of the tanks 13, 14, 15, 16. The scraper indicated at 65 is operated by the hoist 61, carried on a suitably designed wheeled car 63 mounted for travel transversely of the said tanks on suitable rails. This car also carries the hopper 62 having a belt feeder 64 located thereunder. A suitable track clamp (not shown) may be provided to hold the car stationary while the scraper is in operation in any given tank. The hopper 62 is covered with bars spaced to allow the ore to discharge from the scraper, but sufficiently close together to support the scraper. This method of handling the partly leached charge is not essential, though it is preferred. Instead of using a power scraper, the tanks 13, 14, 15, 16 may be provided with tailing gates for the discharge of the charge onto a conveyor which will carry the charge to the elevator 7.

The hoist and feeder assembly are supplied with suitable motor drives, not shown.

The feeder 64 delivers a uniform stream of ore to the conveyor 5 and this ore is joined with the proper sulfide ore or other fuel to provide a combined charge which passes to elevator 7 and conveyor 8 and again through the roasters 10.

In general with coarse ore such as will be treated by this system, sufficient mixing is provided by the transfers through the conveying and elevating systems. However, a suitable mixer can be installed if found to be necessary.

I have found also that the coarse ore when well drained carries the proper moisture to roast well in the furnaces. When a chloride leaching solution is used, as a rule it has sufficient salt for the following roast. However, additional salt may be added if needed.

On the second cycle the re-roasted ore is sluiced by way of launders 12 into the second tank of the series, for instance tank 14, and the solution drained, completing the cycle.

After tank 14 has been allowed sufficient time to drain, it is discharged by means of the power scraper 65, and the mixture is elevated to the roaster bins, as before. On this, the third cycle of treatment, the ore is sluiced to the finishing tank 15 or 16 and, after final leaching and washing, the residues are run to waste.

The number of cycles, or re-passes of the ore which will afford the most economical recovery, will vary with the grade of the ore, its sulfur content, and the cost of the "process cycle". Obviously, when the net value of the additional metals recovered, does not return a profit above the cost of the operation, the economic limit has been passed.

The arrangement shown wherein the roasters are supported on the leaching tanks, makes a compact installation. The exposed surface of the tanks at the ends, may be covered, and all the steam and gas may be drawn off through the passage 66 to either a chimney or a ventilating fan.

In large capacity plants, for structural reasons, it may be preferable to locate the leaching tanks to one side of the roasters. In such cases it would also be preferable to conduct the second cycle, and subsequent cycles if required, in a separate unit. Each ore problem will obviously require modifications to meet variations for each class of ore, size of plant and local conditions.

The sluicing system of tank filling, renders it possible to conserve the heat developed in the roasters and to transfer it to the leaching solutions. In most cases this is of great advantage, as a warm or hot solution is a much more active solvent than a cold solution. The rich solution flowing from the sluice tanks will be near the boiling point. Such hot solutions are extremely active, both as regards the solution of the metals and their subsequent precipitation. In fact, when the efficient recovery of the lead is desired, and iron precipitation is used, a hot solution is essential.

Another feature of importance in localities where salt is expensive, is the concentrating action of evaporation on the acid chloride solution. This makes possible the use of more wash water on the leaching residues, thereby returning the salt to the system. This salt ordinarily passes out in the tailings.

The salt is effectively utilized as the moisture in the mix for the second and third roasting cycles. It appears likely that less salt is required in most cases for multiple treatment; and the penetration of the hot brine into the ore is very effective when the ore again reaches a chloridizing temperature in the roaster.

Another advantage of dropping the hot roasted ore directly into the leaching solution two or three times is that by repeated heating and quenching, the ore particles become cracked and porous. Thus, the leaching solutions are enabled to penetrate the coarse particles, thereby dispensing with the necessity for fine grinding. For example, on one ore which by previous practice had to be crushed to 20 mesh before roasting and leaching, I found I could make higher recoveries by the present cyclic treatment when only crushing the ore to 2 mesh.

I have found in chloride blast roasting and leaching of silver ores that certain silver bearing compounds are not chloridized by one pass through the furnace, because the combined sulfur is not eliminated until the chloridizing zone is passed. Such ores, when passed through the roasters a second time, give a high recovery.

Many ores contain too much sulfur for a single treatment in a blast roaster. This condition is solved by my process, by mixing sufficient of the roasted ore with the raw ore, to obtain the proper temperature regulation in the roaster. Thus the roasted ore dilutes the sulfur content of the raw ore sufficiently to permit direct roasting, whilst the raw ore supplies the necessary fuel to re-roast the roasted ore.

My process is flexible and can be used in connection with various grades of ore. If the ore is of low grade, it may pass the roasters only twice, but if the metal content is high, it may be kept in the circuit to pass five or more times. The number of passes or cycles is dependent only on the economic results obtained.

While my new cyclic process is not dependent on the roaster which is shown in Figs. 1, 3 and 4, nevertheless I have found that this roaster, which embodies improvements on the roasters of the patents hereinbefore mentioned, although utilizing the principle thereof, is well adapted for carrying out the roasting part of each cycle of the process.

The principle of the multiple roaster now to be described is substantially the same as that of the roasters of the patents heretofore referred to but the roaster embodies improvements, increasing its efficiency and ease with which it may be operated, as well as enabling the attendants to escape the dust and fumes. Less floor space is required, although the capacity of the roaster is increased, economies in installation and operation being effected.

While not illustrated, the roof and the building may be conveniently supported on the roaster assembly, thus decreasing the cost of the building.

The concrete work supports the walls of the bin 9. The smoke flue 23 serves as a common trunk for the duplicate roasting chambers 24, 25 which communicate with said flue by the ports 26. The top and sides of the flue 23 are arched so that the ore in the bin 9 automatically gravitates to the feed holes or openings 27 of the roasters 24, 25. Controlling gates 28, operable by hand levers 29, enable the attendants to allow the ore, in any desired quantity, to gravitate into the roasting chambers 24, 25. The levers 29 can be conveniently operated by attendants standing on the operating floor 30. Operating doors are shown at 31.

The rockable grates 32 support the charge undergoing roasting. Bins 33, receive the roasted, crushed, ore when it is dropped by the grates 32. The ore from the bins 33 may be discharged through the gates 11 into the distributing launders 12 as previously described.

The main air flue or duct 34 containing the air under pressure which is utilized to provide the blast for the roasters, is located intermediate the bins 33 and the blast is delivered into the bins 33 beneath the grates 32 through the ports or openings 35, 36.

Hinged gate valves 37, which are operated by rods 38, and levers 39, enable any desired blast to be admitted to a given roaster. The lever 39 is provided with means whereby it may be locked to provide any desired setting of the valve 37 and is readily operable by an attendant standing on the floor 30.

The chamber or room 40 enables the oiler and other attendants to have access to the operating means for the grates 32 without being subject to dust and fumes. The deck of the roaster having been made lower, and the depth of the roasting chambers 24, 25 decreased, the operating floor 30 can be located below the bearings for the grate bars 32, rendering attendance and oiling easy. Furthermore, by decreasing the distance the ore falls, on entering the chambers 24, 25, through the openings 27, the ore does not pack so tightly as it would if it fell a considerable distance and thus more uniform roasting speed or ascent of the "roast" is obtained.

A single line shaft 41, driven by a belt 42 from a motor 43, serves to provide power for rocking all of the grate bars 32 of the roasters. The grate bars are driven from the single line shaft 41 by sets of gears 44, shafts 45, and operative connections 46. Clutches 48, under the control of links 49, bell cranks 50, and hand levers 41, enable the different clutches to be controlled as desired so that different sections of the grates may be selectively operated independently of other sections thereof, for the purpose set forth in Patent 1,251,189.

The levers 51 are arranged conveniently for operation from the floor 30.

It will be observed that the attendants are substantially free from fumes and dust when in the chamber 40, while taking care of the operative connections and when on the floor 30 and that any desired ventilation of chamber 40 can be had by providing for the admission of air from duct 34. Furthermore, only a single air blast duct 34 and smoke flue 23 are required for the roasters.

What I claim is:

1. A continuous process for treating ore, consisting in subjecting the ore to a plurality of successive cycles of treatment, each of which comprises chloridizing blast roasting, immediately followed by leaching of the roasted ore while it is hot as the next step, thereby to increase the chemical activity of the leaching solution and to render the ore porous during each cycle, and then adding to the roasted and leached ore a fuel or fuel-bearing-ore before the ore is again subjected to chloridizing blast roasting on the beginning of the next cyclic treatment.

2. A continuous process for treating ore, consisting in subjecting the ore to a plurality of successive chloridizing blast roastings, with intermediate chloridizing leaching of the hot roasted ore immediately following roasting as the next step, thereby to render the ore porous and to increase the chemical activity of the leaching solution.

3. A continuous process for treating ore, consisting in successively passing coarsely crushed ore through a plurality of cycles each of which comprises chloride blast roasting of the ore immediately followed by the quenching thereof in a chloride leaching solution while the ore is hot, thereby to crack the coarse particles of ore to expose the metal particles borne thereby, to avoid the expense of finely dividing the ore prior to roasting.

4. A continuous process for treating ore, consisting in successively passing coarsely crushed ore through a plurality of cycles each of which comprises chloride blast roasting of the ore immediately followed by the quenching thereof in a chloridizing leaching solution while the ore is hot as the next step, thereby to crack the coarse particles of ore to expose the metal particles borne thereby, to avoid the expense of finely dividing the ore prior to roasting, quenching in a preceding cycle being followed as the next step by blast chloridizing roasting in a succeeding cycle.

5. A continuous process for treating ore, consisting in subjecting the ore to successive cycles of treatment, comprising the following steps: chloridizing roasting of the ore, immediately followed by leaching the ore when the ore is hot, thereby to open up the ore and render it porous, immediately chloridizing roasting the previously roasted and leached ore, immediately followed by further leaching of the rechloridized roasted ore as a part of said continuous cyclic process.

In testimony whereof I affix my signature.

THEODORE P. HOLT.